United States Patent
Gordon et al.

(10) Patent No.: US 9,976,383 B2
(45) Date of Patent: May 22, 2018

(54) TRACEABLE POLYMERIC ADDITIVES FOR USE IN SUBTERRANEAN FORMATIONS

(71) Applicant: Halliburton Energy Services, Inc., Houston, TX (US)

(72) Inventors: Christopher Lynn Gordon, Spring, TX (US); Craig Wayne Roddy, Duncan, OK (US); Jiten Chatterji, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/412,875

(22) Filed: Jan. 23, 2017

(65) Prior Publication Data

US 2017/0130118 A1     May 11, 2017

Related U.S. Application Data

(62) Division of application No. 14/412,112, filed as application No. PCT/US2013/071495 on Nov. 22, 2013, now Pat. No. 9,580,637.

(51) Int. Cl.
| | |
|---|---|
| *E21B 33/13* | (2006.01) |
| *C09K 8/467* | (2006.01) |
| *C04B 28/02* | (2006.01) |
| *C04B 20/10* | (2006.01) |
| *C04B 24/24* | (2006.01) |
| *C09K 8/035* | (2006.01) |
| *C09K 8/40* | (2006.01) |
| *C09K 8/60* | (2006.01) |

(Continued)

(52) U.S. Cl.
CPC .............. *E21B 33/13* (2013.01); *C04B 20/10* (2013.01); *C04B 24/24* (2013.01); *C04B 28/02* (2013.01); *C09K 8/035* (2013.01); *C09K 8/40* (2013.01); *C09K 8/467* (2013.01); *C09K 8/52* (2013.01); *C09K 8/60* (2013.01); *E21B 47/0005* (2013.01)

(58) Field of Classification Search
None
See application file for complete search history.

(56) References Cited

U.S. PATENT DOCUMENTS

| | | |
|---|---|---|
| 2,231,577 A | 2/1941 | Hare |
| 5,572,021 A | 11/1996 | Hethman et al. |

(Continued)

FOREIGN PATENT DOCUMENTS

| | | |
|---|---|---|
| CA | 811094 | 4/1969 |
| GB | 2489714 | 10/2012 |

(Continued)

OTHER PUBLICATIONS

Patent Examination Report No. 1 for Australian Patent Application No. 2013405868 dated Aug. 19, 2016.

(Continued)

*Primary Examiner* — Anuradha Ahuja
(74) *Attorney, Agent, or Firm* — Craig W. Roddy; Tumey L.L.P.

(57) ABSTRACT

Disclosed are traceable polymeric additives that comprise a tagging material and methods of using the traceable polymeric additives in subterranean applications, such as cementing. An embodiment discloses a well treatment composition comprising a base fluid and a traceable polymeric additive comprising a polymer and a tagging material.

13 Claims, 4 Drawing Sheets

(51) Int. Cl.
*C09K 8/52* (2006.01)
*E21B 47/00* (2012.01)

(56) References Cited

U.S. PATENT DOCUMENTS

| | | | | |
|---|---|---|---|---|
| 5,783,822 | A * | 7/1998 | Buchanan | C04B 22/00 |
| | | | | 250/259 |
| 5,929,437 | A * | 7/1999 | Elliott | E21B 47/1015 |
| | | | | 250/259 |
| 6,508,305 | B1 | 1/2003 | Brannon et al. | |
| 6,645,288 | B1 | 11/2003 | Dargaud et al. | |
| 6,645,769 | B2 | 11/2003 | Tayebi et al. | |
| 6,742,592 | B1 | 6/2004 | Le Roy-Delage et al. | |
| 6,902,001 | B2 | 6/2005 | Dargaud et al. | |
| 7,264,053 | B2 | 9/2007 | Vargo, Jr. et al. | |
| 7,284,611 | B2 | 10/2007 | Reddy et al. | |
| 7,607,482 | B2 | 10/2009 | Roddy et al. | |
| 7,607,484 | B2 | 10/2009 | Roddy et al. | |
| 7,617,870 | B1 | 11/2009 | Roddy et al. | |
| 7,726,397 | B2 * | 6/2010 | McDaniel | C09K 8/805 |
| | | | | 166/247 |
| 7,784,542 | B2 | 8/2010 | Roddy et al. | |
| 7,927,419 | B2 | 4/2011 | Roddy et al. | |
| 7,934,554 | B2 | 5/2011 | Roddy | |
| 8,030,253 | B2 | 10/2011 | Roddy et al. | |
| 8,100,177 | B2 | 1/2012 | Smith, Jr. et al. | |
| 8,291,975 | B2 | 10/2012 | Roddy et al. | |
| 8,555,967 | B2 | 10/2013 | Chatterji et al. | |
| 2001/0036667 | A1 * | 11/2001 | Tayebi | E21B 47/1015 |
| | | | | 436/56 |
| 2004/0094297 | A1 * | 5/2004 | Malone | E21B 47/1015 |
| | | | | 166/250.12 |
| 2005/0109087 | A1 | 5/2005 | Robb et al. | |
| 2007/0034373 | A1 | 2/2007 | McDaniel et al. | |
| 2007/0108380 | A1 * | 5/2007 | Poe | E21B 47/1015 |
| | | | | 250/269.6 |
| 2008/0017376 | A1 * | 1/2008 | Badalamenti | C04B 28/02 |
| | | | | 166/292 |
| 2009/0087912 | A1 | 4/2009 | Ramos et al. | |
| 2009/0205825 | A1 | 8/2009 | Smith et al. | |
| 2009/0210161 | A1 * | 8/2009 | Duenckel | G01V 5/101 |
| | | | | 702/8 |
| 2009/0288820 | A1 * | 11/2009 | Barron | B01J 13/02 |
| | | | | 166/249 |
| 2010/0212891 | A1 * | 8/2010 | Stewart | E21B 23/00 |
| | | | | 166/250.12 |
| 2010/0307744 | A1 | 12/2010 | Cochet et al. | |
| 2010/0307745 | A1 * | 12/2010 | Lafitte | C09K 8/62 |
| | | | | 166/250.12 |
| 2010/0314108 | A1 * | 12/2010 | Crews | C09K 8/50 |
| | | | | 166/250.12 |
| 2011/0160096 | A1 | 6/2011 | Roddy | |
| 2011/0277996 | A1 * | 11/2011 | Cullick | E21B 33/138 |
| | | | | 166/250.12 |
| 2011/0303408 | A1 | 12/2011 | Hartshorne et al. | |
| 2012/0292023 | A1 * | 11/2012 | Hinkie | E21B 47/12 |
| | | | | 166/255.1 |
| 2013/0109597 | A1 | 5/2013 | Sarkar et al. | |
| 2014/0060832 | A1 * | 3/2014 | Mahoney | E21B 43/267 |
| | | | | 166/280.2 |

FOREIGN PATENT DOCUMENTS

| | | |
|---|---|---|
| WO | 2009027685 | 3/2009 |
| WO | 2013/168136 | 11/2013 |

OTHER PUBLICATIONS

Ccementing, "The Family of WellLife(R) Additives," Halliburton product brochure, May 2013.

"Cementing: Hi-Dense(R) Weight Additives," Halliburton Product Brochure, 2007.

D-AIR 3000TM and D-AIR 3000LTM Defoamers—Cementing, Halliburton product brochure, Aug. 2007.

"Cementing: ZoneSeal(R) Isolation Process and Foam Systems," Halliburton Product Brochure, Sep. 2014.

PCT Search Report and Written Opinion for PCT/US2013/071495 dated Aug. 25, 2014.

USPTO Office Action for U.S. Appl. No. 14/412,112 dated Jul. 29, 2016.

USPTO Office Action for U.S. Appl. No. 14/412,112 dated Dec. 23, 2015.

USPTO Final Office Action for U.S. Appl. No. 14/412,112 dated Apr. 21, 2016.

USPTO Notice of Allowance for U.S. Appl. No. 14/412,112 dated Dec. 9, 2016.

Supplemental European Search Report for Application No. EP 13 89 7776 dated Feb. 14, 2017.

European Examination Report for Application No. 13897776.4-1354 dated Jan. 3, 2018.

* cited by examiner

TRACEABLE POLYMERIC ADDITIVES FOR USE IN SUBTERRANEAN FORMATIONS

CROSS-REFERENCE TO RELATED APPLICATIONS

The present application is a divisional application of U.S. patent application Ser. No. 14/412,112, filed Dec. 30, 2014, which was a national stage entry of International Application No. PCT/US2013/071495, filed Nov. 22, 2013, the entire disclosures of which are incorporated herein by reference.

BACKGROUND

Embodiments are directed to polymeric additives for use in subterranean formations and, in certain embodiments, to traceable polymeric additives that comprise a tagging material and methods of using the traceable polymeric additives in subterranean applications, such as cementing.

Cement compositions may be used in a variety of subterranean applications. For example, cement compositions may be used in primary cementing operations whereby pipe strings, such as casing and liners, may be cemented in wellbores. In a typical primary cementing operation, a cement composition may be pumped into an annulus between the exterior surface of the pipe string disposed therein and the walls of the wellbore (or a larger conduit in the wellbore). The cement composition may set in the annulus, thereby forming an annular sheath of hardened, substantially impermeable material (e.g., a cement sheath) that may support and position the pipe string in the wellbore and may bond the exterior surface of the pipe string to the wellbore walls (or to the larger conduit). Among other things, the cement sheath surrounding the pipe string should function to prevent the migration of fluids in the annulus, as well as protecting the pipe string from corrosion. Cement compositions may also be used in remedial cementing methods, such as in the placement of a cement plug or in squeeze cementing for sealing voids in a pipe string, cement sheath, gravel pack, subterranean formation, and the like.

Polymeric additives, such as elastomers, may be included in a cement composition. Among other reasons, elastomers may be included in a cement composition to improve the mechanical properties of the set cement composition. For example, elastomers may be included in a cement composition to improve the elasticity and ductility of the set cement composition, thereby potentially counteracting possible stresses that may be encountered by the cement composition in a wellbore. In some instances, elastomers that swell upon contact with water and/or oil may be used. These swellable elastomers may help maintain zonal isolation, for example, by swelling when contacted by oil and/or water to seal cracks in the cement sheath and/or micro-annulus between the cement sheath and the pipe string or formation that may be created.

When elastomers are included in a cement composition, the elastomers may tend to float, which could leave certain areas of the cement composition with little or no elastomer. As a result, the cement composition may not have a uniform density distribution when introduced into the formation, resulting in a potential for the design specifications of the cement composition to not be met. Therefore, it can be desirable to determine the location of the polymeric additives such as elastomers in the cement composition.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
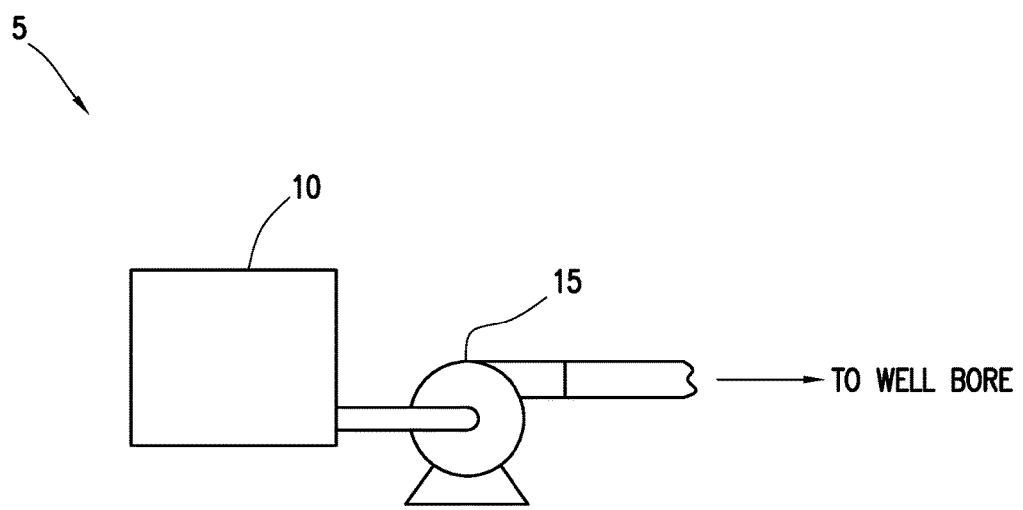
FIG. 1 is a schematic illustration of a system for the preparation and delivery of a cement composition comprising a traceable polymeric additive to a wellbore in accordance with certain embodiments.

Embodiments are directed to polymeric additives for use in subterranean formations and, in certain embodiments, to traceable polymeric additives that comprise a tagging material and methods of using the traceable polymeric additives in subterranean applications, such as cementing. In accordance with present embodiments, the "polymeric additives" disclosed herein may be referred to as "traceable" because a tagging material (e.g., a thermal neutron absorbing material) may be included in polymeric additives wherein the tagging material allows location of the polymeric additives to be determined after placement into a wellbore. By knowing their location, an operator may determine if the traceable polymeric additives have segregated in the fluid in the wellbore, allowing remedial measures to be taken if desired. In addition to cementing, the traceable polymeric additives may be used in other subterranean applications, such as the reduction of annular pressure buildup.

In some embodiments, the traceable polymeric additives may be included in a cement composition. An example of a cement composition may comprise hydraulic cement, a traceable polymeric additive, and water. Those of ordinary skill in the art will appreciate that embodiments of the cement compositions generally should have a density suitable for a particular application. By way of example, embodiments of the cement compositions may have a density of about 4 pounds per gallon ("lb/gal") to about 20 lb/gal. Embodiments of the cement compositions may be foamed or unfoamed or may comprise other means to reduce their densities, such as hollow microspheres, low-density elastic beads, or other density-reducing additives known in the art. In some embodiments, weighting agents may be used to increase the density of the cement composition. Those of ordinary skill in the art, with the benefit of this disclosure, will recognize the appropriate density for a particular application.

Any of a variety of hydraulic cements suitable for use in subterranean cementing operations may be used in accordance with embodiments of the cement compositions. Suitable examples include hydraulic cements that comprise calcium, aluminum, silicon, oxygen and/or sulfur, which set and harden by reaction with water. Examples of such hydraulic cements, include, but are not limited to, Portland cements, pozzolana cements, gypsum cements, high-alumina-content cements, slag cements, silica cements, and combinations thereof. In certain embodiments, the hydraulic cement may comprise a Portland cement. In some embodiments, the Portland cements are classified as Classes A, C, H, or G cements according to American Petroleum Institute,

*API Specification for Materials and Testing for Well Cements*, API Specification 10, Fifth Ed., Jul. 1, 1990. In addition, in some embodiments, the hydraulic cement may include cements classified as ASTM Type I, II, or III.

A traceable polymeric additive may be included in embodiments of the cement compositions. The traceable polymeric additives may be a composite material that comprises a polymer and a tagging material. The traceable polymeric additive may be included in the cement composition to improve the mechanical properties of the cement composition after setting. For example, the traceable polymeric additive may improve the elasticity and ductility of the set cement composition, thereby potentially counteracting possible stresses that may be encountered by the cement composition in a wellbore. In addition, by inclusion of the tagging material, the polymeric additives may be traceable allowing detection in the wellbore. Accordingly, any potential issues with segregation may be detected and addressed by remedial measures if needed.

A wide variety of polymers may be employed, including homopolymers, copolymers, interpolymers, and mixtures of polymers. In some embodiments, the polymer may be a swellable polymer. As used herein, a polymer is characterized as swellable when it swells upon contact with oil and/or aqueous fluids (e.g., water). By way of example, the polymer may be an oil-swellable polymer that it swells upon contact with any of a variety of oils, such as crude oil, diesel oil, kerosene and the like, as well as, oil-based fluids and gas or liquid hydrocarbons located in subterranean formations. By way of further example, the elastomer may be a water-swellable polymer that swells upon contact with aqueous fluids, such as fresh water, salt water and the like, as well as, water-based fluids and aqueous fluids located in subterranean formations. Among other things, use of a swellable polymer in embodiments of the cement compositions may help maintain zonal isolation, for example, by swelling when contacted by oil and/or aqueous fluids to seal cracks in the cement sheath and/or micro-annulus between the cement sheath and the pipe string or formation that may be created.

Swellable polymers suitable for use in embodiments of the cement compositions may generally swell by up to about 50% or more of their original size at the surface. Under downhole conditions, this swelling may be more (or less) dependent on the conditions presented. For example, the swelling may be about 10% or more at downhole conditions. In some embodiments, the swelling may be up about 50% or more under downhole conditions. However, as those of ordinary skill in the art, with the benefit of this disclosure, will appreciate, the actual swelling when the swellable polymer is included in a cement composition may vary, for example, based on the concentration of the swellable polymer included in the cement composition and the amount of oil and/or aqueous fluid present, among other factors.

In some embodiments, the polymer may be an elastomer. A wide variety of elastomers may be employed, including natural, synthetic, thermoplastic, and thermosetting elastomers. In particular embodiments, the elastomer may be swellable. Some specific examples of swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene rubber (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer rubber (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of styrene-butadiene rubber. Examples of suitable elastomers that swell in contact with oil include, but are not limited to, nitrile rubber (NBR), hydrogenated nitrile rubber (HNBR, HNS), fluoro rubbers (FKM), perfluoro rubbers (FFKM), tetrafluorethylene/propylene (TFE/P), and isobutylene maleic anhydride.

In some embodiments, the elastomer may be water-swellable. Water-swellable elastomers may, for example, be derived from monomers which may include butadiene, chloroprene or isoprene copolymerized with monomers which produce polymers that are water-swellable. Additional monomers may include open-chain conjugated dienes having from 5 to 8 carbon atoms, such as 2,3-dimethylbutadiene, 1,4-dimethylbutadiene, and piperylene. In some embodiments, the monomers may be copolymerized with a monomer which will render the elastomer water swellable, such as unsaturated polymerizable carboxylic acids (e.g., maleic cid, fumaric acid, etc.), sulfonic acids, and phosphoric acids. Polymerizable unsaturated molecules which contain more than one sulfonic, sulfate, phosphoric, or phosphate group may also be suitable for copolymerization with the monomers. Elastomeric copolymers containing monomers having water susceptible groups such as amides, amines and hydroxyl may also be used in some embodiments. Examples of such monomers may include, without limitation, furnaramide, acrylamide, and methacrylamide. Copolymers of any combination of the above monomers with monomers containing conjugated unsaturation may be obtained by copolymerizing the elastomeric engendering monomer with monomers that may be reacted to provide water swellability. Such polymers may include copolymers of diene monomers with acrylonitrile, acrylate esters and amides, methacrylate esters and amides, and maleic anhydride. These copolymers may be hydrolyzed to provide copolymers containing unsaturated chemical units and carboxylic acid units. Other reactions to provide suitable elastomers may include reactions on polymers such as hydrolysis of copolymers of vinyl acetate to give hydroxyl groups, ammonolysis of ester groups to give amide groups, and sulfonation to give elastomers which have sulfonic acid groups.

Combinations of swellable elastomers may also be used. Other elastomers that behave in a similar fashion with respect to oil or aqueous fluids also may be suitable. Those of ordinary skill in the art, with the benefit of this disclosure, will be able to select an appropriate swellable elastomer for use in the example cement compositions based on a variety of factors, including the application in which the composition will be used and the desired swelling characteristics.

In some embodiments, the polymer may be a water-swellable polymer. By way of example, the water-soluble polymer may include any of a variety of polymers that swell upon contact with water. Some specific examples of water-swellable polymers include, but are not limited to, superabsorbent polymers (such as polymethacrylate and polyacrylamide) and non-soluble acrylic polymers (such as starch-polyacrylate acid graft copolymer and salts thereof), polyethylene oxide polymers, carboxymethyl cellulose type polymers, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, and starch-polyacrylonitrile graft copolymers. Combinations of water-swellable polymers may also be suitable. Other polymers that behave in a similar fashion with respect to aqueous fluids also may be suitable. Those of ordinary skill in the art, with the benefit of this disclosure, will be able to select an appropriate water-swellable polymer based on a variety of factors, including the application in which the composition will be used and the desired swelling characteristics.

Embodiments of the polymers may be dual oil/water swellable, in that the polymer may comprise a combination or mixture of both oil-swellable and water-swellable materials. A polymer is characterized as "dual oil/water-swellable" when it swells upon contact with oil and also swells upon contact with aqueous fluids. In accordance with present embodiments, the oil-swellable material and/or the water-swellable material may comprise an elastomer. By way of example, the swellable polymer may comprise an ethylene-propylene polymer (e.g., ethylene-propylene copolymer rubber or ethylene-propylene-diene terpolymer rubber) and bentonite. By way of further example, the swellable polymer may comprise a butyl rubber and sodium bentonite.

Tagging materials may be included in the traceable polymeric additives. Inclusion of the tagging material may allow the use of typical wellbore logging devices to determine the location of the traceable polymeric additives in the wellbore. In particular embodiments, the tagging material may be dispersed in the polymer. In alternative embodiments, the tagging material may be at least partially coated on the polymer. For example, the tagging material may be included in a coating on the polymer, such as a resin coating.

Suitable tagging materials may comprise relatively inert materials and/or also materials that are thermal neutron absorbing materials. In some embodiments, the tagging materials may be inert to the chemical and physical properties of the cement composition. In some embodiments, these tagging materials should cause no significant changes in the conventional, desirable cement properties of cement composition, such properties may include density, rheology, pumping time, fluid loss, static gel strength, permeability, etc. Additionally, materials which themselves are not environmentally destructive may be used in particular embodiments.

Thermal neutron absorbing materials may comprise any element which has a thermal neutron absorbing capability of a magnitude such that differences in the backscattered thermal neutrons before and after the traceable polymeric additive is introduced into a well bore can be detected. Example embodiments may comprise thermal neutron absorbing materials for use with neutron logging devices, however, tagging materials may comprise a variety of materials including those known in the art. Examples of suitable thermal neutron absorbing materials include cadmium, boron, gadolinium, iridium, and mixtures thereof. The boron may comprise boron carbide, boron nitride, boric acid, high boron concentrated glass, zinc borate, borax, and mixtures thereof. The gadolinium may comprise gadolinium oxide, gadolinium hydroxide, gadolinium acetate, high gadolinium concentrated glass, and mixtures thereof.

The amount of the tagging material used in embodiments of the traceable polymeric additives generally may depend on a number of factors, including the particular elastomer, the particular tagging material, and cost, among others. In certain embodiments, the traceable polymeric additives may have a weight ratio of the elastomer to the tagging material of about 99:1 to about 0.1:1 and, alternatively, a weight ratio of about 3:1 to about 1:1.

The traceable polymeric additive may be added to embodiments of the cement composition by dry blending with the hydraulic cement before the addition of the water, by mixing with the water to be added to the hydraulic cement, or by mixing with the cement composition consecutively with or after the addition of the water. Moreover, the traceable polymeric additive may be included in embodiments of the cement compositions in an amount desired for a particular application. In some embodiments, the traceable polymeric additive may be present in an amount of about 0.1% to about 100% by weight of the hydraulic cement ("bwoc") (e.g., about 1%, about 5%, about 10%, about 20%, about 30%, about 40%, about 50%, about 60%, about 70%, about 80%, about 90%, etc.). In certain embodiments, the traceable polymeric additive may be present in an amount of about 1% to about 30% bwoc, in an amount of about 5% to about 25% bwoc, or in an amount of about 15% to about 20% bwoc. In particular embodiments, the tagging material may be present in an amount of about 5% bwoc or less.

In addition, the traceable polymeric additives generally may be in particulate form. As used herein, the term "particulate" refers to materials in solid state having a well-defined physical shape as well as those with irregular geometries, including any particulates elastomers having the physical shape of platelets, shavings, fibers, flakes, ribbons, rods, strips, spheroids, hollow beads, toroids, pellets, tablets, or any other physical shape. In some embodiments, the traceable polymeric additives may have a particle size in the range of about 5 microns to about 1,500 microns. In some embodiments, the traceable polymeric additives may have a particle size in the range of about 20 microns to about 500 microns. However, particle sizes outside these disclosed ranges may also be suitable for particular applications.

Other additives suitable for use in subterranean cementing operations also may be added to embodiments of the cement compositions as deemed appropriate by one of ordinary skill in the art. Examples of such additives include, but are not limited to, strength-retrogression additives, set accelerators, set retarders, weighting agents, lightweight additives, gas-generating additives, mechanical property enhancing additives, lost-circulation materials, dispersants, fluid loss control additives, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will readily be able to determine the type and amount of additive useful for a particular application and desired result.

Strength-retrogression additives may be included in embodiments of the cement composition to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Set accelerators may be included in embodiments of the cement compositions to, for example, increase the rate of setting reactions. Control of setting time may allow for the ability to adjust to well bore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in embodiments of the cement compositions to, for example, increase the thickening time of the cement compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Weighting agents are typically materials that weigh more than water and may be used to increase the density of a cement composition. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in embodiments of the cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in embodiments of the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in embodiments of the cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Dispersants may be included in embodiments of the cement compositions. Where present, the dispersant should act, among other things, to control the rheology of the cement composition. While a variety of dispersants known to those skilled in the art may be used in certain embodiments, examples of suitable dispersants include naphthalene sulfonic acid condensate with formaldehyde; acetone, formaldehyde, and sulfite condensate; melamine sulfonate condensed with formaldehyde; any combination thereof.

Fluid-loss-control additives may be included in embodiments of the cement compositions to, for example, decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Defoaming additives may be included in embodiments of the cement compositions to, for example, reduce tendency for the cement composition to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in embodiments of the cement compositions to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The cement compositions comprising hydraulic cement, a traceable polymeric additive, and water may be used in a variety of cementing applications. In some embodiments, a method of the present invention may comprise providing a cement composition comprising hydraulic cement, a traceable polymeric additive, and water; and allowing the cement composition to set. As described above, the traceable polymeric additive may comprise an elastomer and a tagging material. As will be appreciated, the cement composition may be allowed to set in any suitable location where it may be desired for the cement composition to set into a hardened mass. By way of example, the cement composition may be allowed to set in a variety of locations, both above and below ground.

Additionally, embodiments of the cement compositions may be used in a variety of subterranean operations, including primary and remedial cementing. In some embodiments, a cement composition may be provided that comprises hydraulic cement, a traceable polymeric additive, and water. The cement composition may be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both. In some embodiments, a wellbore log (e.g., a cement bond log) may be prepared that may show where the tagging materials are located in the wellbore. This log can allow operators to determine whether segregation of the tagging materials in the wellbore has occurred.

In primary cementing embodiments, for example, the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

In remedial cementing embodiments, a cement composition may be used, for example, in squeeze-cementing operations or in the placement of cement plugs. By way of example, the cement composition may be placed in a wellbore to plug an opening (e.g., a void or crack) in the formation, in a gravel pack, in the conduit, in the cement sheath, and/or between the cement sheath and the conduit (e.g., a microannulus).

While the preceding discussion is directed to the use of a traceable polymeric additive in cementing methods, those of ordinary skill in the art will appreciate that the traceable polymeric additives may also be used in a variety of different subterranean treatments, including drilling fluids, completing fluids, stimulation fluids, spacer fluids, and well clean-up fluids. The traceable polymeric additives may be included in these well treatment fluids in any suitable amount for a particular application, including from about 1% to about 60% by volume of the well treatment fluid. In accordance with one embodiment, a traceable polymeric additive may be included in a spacer fluid. For example, a spacer fluid may be placed between two fluids contained in or to be pumped within a wellbore. Examples of fluids between which spacer fluids are utilized include between cement compositions, and drilling fluids, between different drilling fluids during drilling fluid change outs and between drilling fluids and completion brines. Among other things, spacer fluids may be used to enhance drilling fluid and filter cake removal from the walls of wellbores, to enhance displacement efficiency and to physically separate chemically incompatible fluids. For example, a cement composition and a drilling fluid may be separated by a spacer fluid when the cement composition is placed in the wellbore. In accordance with embodiments of the present invention, the spacer fluid may prevent, or at least partially reduce, intermixing of the cement composition and the drilling fluid and may facilitate the removal of filter cake and gelled drilling fluid from the walls of the wellbore during displacement of the drilling fluid by the cement composition. In accordance with another embodiment, the traceable polymeric additive may be included in a drilling fluid. By way of example, a method may comprise using a drill bit to enlarge a wellbore; and circulating a drilling fluid that comprises a traceable polymeric additive past the drill bit to remove cuttings.

As will be appreciated by those of ordinary skill in the art, embodiments of the traceable polymeric additives may be used to control lost circulation. In some embodiments, lost circulation zones may be encountered into which drilling fluid (or other treatment fluid) circulation can be lost. Lost circulation zones include zones of a subterranean formation containing fractures or other openings into which treatment fluids may be lost. As a result, the well treatment (e.g., drilling) typically must be terminated with the implementation of remedial procedures, for example. In accordance with embodiments, the traceable polymeric additives may be introduced into a wellbore penetrating the subterranean formation to seal the lost circulation zones and prevent the uncontrolled flow of fluids into or out of the lost circulation zones, e.g., lost drilling fluid circulation, crossflows, underground blow-outs and the like. In embodiments, a treatment fluid comprising the traceable polymeric additives may be introduced into the lost circulation zone. In an embodiment, the treatment fluid may be pumped through one or more openings at the end of the string of drill pipe. For example, the treatment fluid can be pumped through the drill bit. In addition to drilling fluids, embodiments may also be used to control lost circulation problems encountered with other fluids, for example, spacer fluids, completion fluids (e.g., completion brines), fracturing fluids, and cement compositions that may be placed into a well bore.

In some embodiments, the traceable elastomeric particles may be used to combat annular pressure buildup. Hydrocarbons (e.g., oil, gas, etc.) that may be produced at the surface may be at elevated temperatures as they flow up through the casing/tubing, thus transferring heat through the pipe string into the wellbore. This may cause fluids in the wellbore annulus to expand. For example, spacer fluids remaining in the wellbore annulus above the cement sheath may heat and expand. Such an expansion may cause an increase in pressure within the wellbore annulus, which is commonly referred to as "annular pressure buildup." Annulus pressure buildup typically occurs when annular volume is fixed. For instance, the wellbore annulus may be closed (e.g., trapped) to isolate fluids in the annulus from outside the annulus. Closing the wellbore annulus may occur near the end of the cementing operation after well completion fluids such as spacer fluids and cement compositions may be in place. By way of example, the wellbore annulus may be closed by closing a valve, energizing a seal, and the like. However, if a fluid is trapped in the closed wellbore annulus experiences a temperature increase, a large pressure increase may be expected because the volume in the annulus is fixed. In some instances, this pressure increase may cause damage to the wellbore, such as damage to the cement sheath, casing, tubulars, or other equipment in the wellbore.

To alleviate problems with annular pressure buildup, the traceable elastomeric particles may be included in a fluid (e.g., a spacer fluid) that is to be left in the wellbore. For example, the fluid comprising the traceable elastomeric particles may become trapped in a wellbore annulus. Embodiments of the traceable elastomeric particles should reduce in volume when exposed to compressive forces at elevated temperatures when trapped in the wellbore annulus. When the compressive force is released, embodiments of the traceable elastomeric particles may be capable of rebounding to their original shape and volume and therefore may be reusable for subsequent instances of annular pressure buildup. In some instances, the compressive force may be generated by expansion of the fluid or another fluid trapped in the wellbore annulus due, for example, to a temperature rise. In some embodiments, hydrocarbon production in the wellbore may cause an increase in annular temperature thus causing expansion of the treatment fluid or another treatment fluid in the wellbore with the resultant compressive force. Without being limited by theory, it is believed that reduction in volume of the traceable elastomeric particles should provide an amount of expansion volume in the wellbore annulus, thus decreasing any potential pressure rise due to the compressive force.

Additional embodiments may include detecting the subterranean location of the traceable polymeric additives after the additives have been introduced into the wellbore, for example, in a cement composition, spacer fluid, or other fluid placed into the wellbore. In some embodiments, a log may be run in the wellbore that can detect the location of the traceable. In some embodiments, the log may be a neutron log. Running the neutron log may include emitting fast neutrons into the wellbore. Conventional dual-spacing neutron tools (commonly referred to as DSN tools) are well known to those skilled in the art and have been utilized heretofore for running neutron logs of subterranean formations. Such tools commonly include a neutron source for emitting fast neutrons, a long spacing thermal neutron detector and a short spacing thermal neutron detector. The DSN neutron tool or another tool containing a source from which fast neutrons are emitted may be lowered in the wellbore whereby the fast neutrons interact with elements in the well and are thermalized thereby. The thermal neutrons produced are backscattered in the well and are detected by a thermal neutron detector in the tool. The detector generates a count representative of the detected thermal neutrons over one or more selected longitudinal subterranean intervals in the wellbore, i.e., the intervals in the wellbore where it is expected that traceable polymeric additives will be located after a treatment is performed in the well.

The subterranean locations of the traceable polymeric additives may be determined based on the differences in the count generated after their introduction and a count representative of the one or more subterranean intervals in the well before their introduction. That is, because the tagging material in the traceable polymeric additives absorbs some of the thermal neutrons as they are generated in the wellbore after their introduction, a comparison of the before and after counts correlated with the locations where the counts were generated indicates the subterranean locations of the traceable polymeric additives.

A thermal neutron count over the locations of interest in a wellbore before introduction of the traceable polymeric additives may be available as a result of the performance of previous treatments therein, etc. If not, a before introduction count may be determined prior to introducing the traceable polymeric additives into the wellbore. That is, a tool containing a fast neutron source may be lowered in the wellbore whereby the fast neutrons interact with elements in the wellbore and are thermalized. The thermal neutrons produced and backscattered in the wellbore may be detected by a thermal neutron detector as described above, and a count representative of the detected thermal neutrons over the one or more selected subterranean intervals in the wellbore may be produced.

An embodiment discloses a method of well treatment. The method may comprise introducing a fluid comprising a traceable polymeric additive into a wellbore, wherein the traceable polymeric additive comprises a polymer and a tagging material.

An embodiment discloses a well treatment fluid comprising: a base fluid; and a traceable polymeric additive comprising a polymer and a tagging material.

An embodiment discloses a well treatment system comprising: a treatment fluid for introduction into a well bore, wherein the treatment fluid comprises a base fluid and a traceable polymeric additive comprising a polymer and a tagging material; and a logging tool for running a neutron log in the wellbore.

Example methods of using the traceable elastomeric particles will now be described in more detail with reference to FIGS. 1-4. FIG. 1 illustrates a system 5 for preparation of a cement composition comprising hydraulic cement, a traceable polymeric additive, and water and delivery of the composition to a wellbore in accordance with certain embodiments. As shown, the cement composition may be mixed in mixing equipment 10, such as a jet mixer, recirculating mixer, or a batch mixer, for example, and then pumped via pumping equipment 15 to the wellbore. In some embodiments, the mixing equipment 10 and the pumping equipment 15 may be disposed on one or more cement trucks as will be apparent to those of ordinary skill in the art. In some embodiments, a jet mixer may be used, for example, to continuously mix a dry blend comprising the hydraulic cement and traceable polymeric additives, for example, with the water as it is being pumped to the wellbore.

Figure 2:
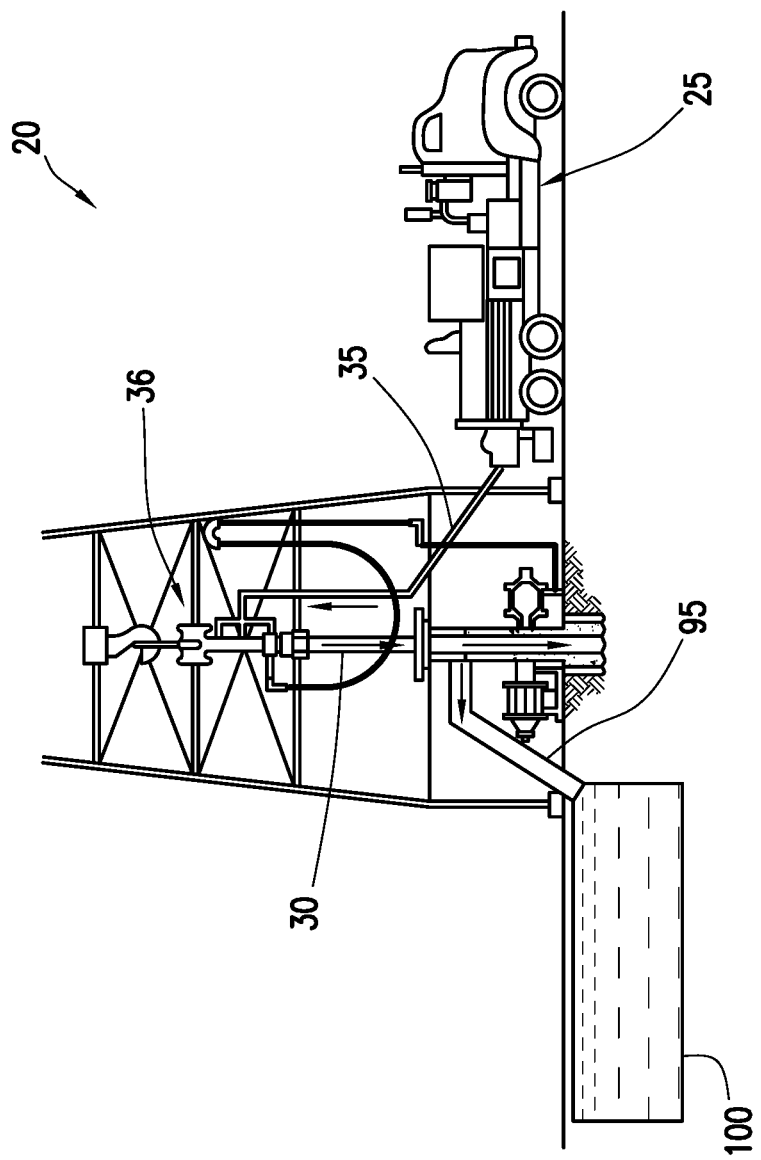
FIG. 2 is a schematic illustration of surface equipment that may be used in the placement of a cement composition comprising a traceable polymeric additive in a wellbore in accordance with certain embodiments.

An example technique for placing a cement composition into a subterranean formation will now be described with reference to FIGS. 2 and 3. FIG. 2 illustrates surface equipment 20 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement composition 30, which may comprise hydraulic cement, a traceable polymeric additive (e.g., 40 on FIG. 3), and water, through a feed pipe 35 and to a cementing head 36 which conveys the cement composition 30 downhole.

Figure 3:
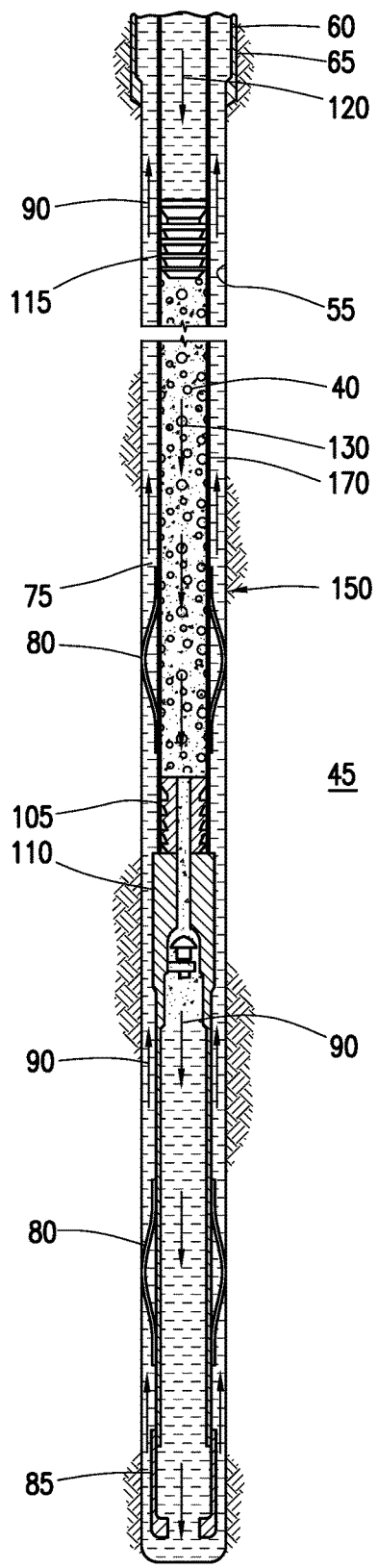
FIG. 3 is a schematic illustration of the placement of a cement composition comprising a traceable polymeric additive into a wellbore annulus in accordance with certain embodiments.

Turning now to FIG. 3, the cement composition 30, which may comprise the traceable polymeric additive 40, may be placed into a subterranean formation 45 in accordance with example embodiments. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 comprises walls 55. In the illustrated embodiment, a surface casing 60 has been inserted into the wellbore 50. The surface casing 60 may be cemented to the walls 55 of the wellbore 50 by cement sheath 65. In the illustrated embodiment, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement composition 30 may be pumped down the interior of the casing 70. The cement composition 30 may be allowed to flow down the interior of the casing 70 through the casing shoe 85 at the bottom of the casing 70 and up around the casing 70 into the wellbore annulus 75. The cement composition 30 may be allowed to set in the wellbore annulus 75, for example, to form a cement sheath that supports and positions the casing 70 in the wellbore 50. While not illustrated, other techniques may also be utilized for introduction of the cement composition 30. By way of example, reverse circulation techniques may be used that include introducing the set-delayed cement composition 30 into the subterranean formation 20 by way of the wellbore annulus 75 instead of through the casing 70.

As it is introduced, the cement composition 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., a mud pit), as shown on FIG. 2. Referring again to FIG. 3, a bottom plug 105 may be introduced into the wellbore 50 ahead of the cement composition 30, for example, to separate the cement composition 30 from the other fluids 90 that may be inside the casing 70 prior to cementing. After the bottom plug 105 reaches the landing collar 110, a diaphragm or other suitable device should rupture to allow the cement composition 30 through the bottom plug 105. In FIG. 3, the bottom plug 105 is shown on the landing collar 110. In the illustrated embodiment, a top plug 115 may be introduced into the wellbore 50 behind the cement composition 30. The top plug 115 may separate the cement composition 30 from a displacement fluid 120 and also push the cement composition 30 through the bottom plug 105.

Figure 4:
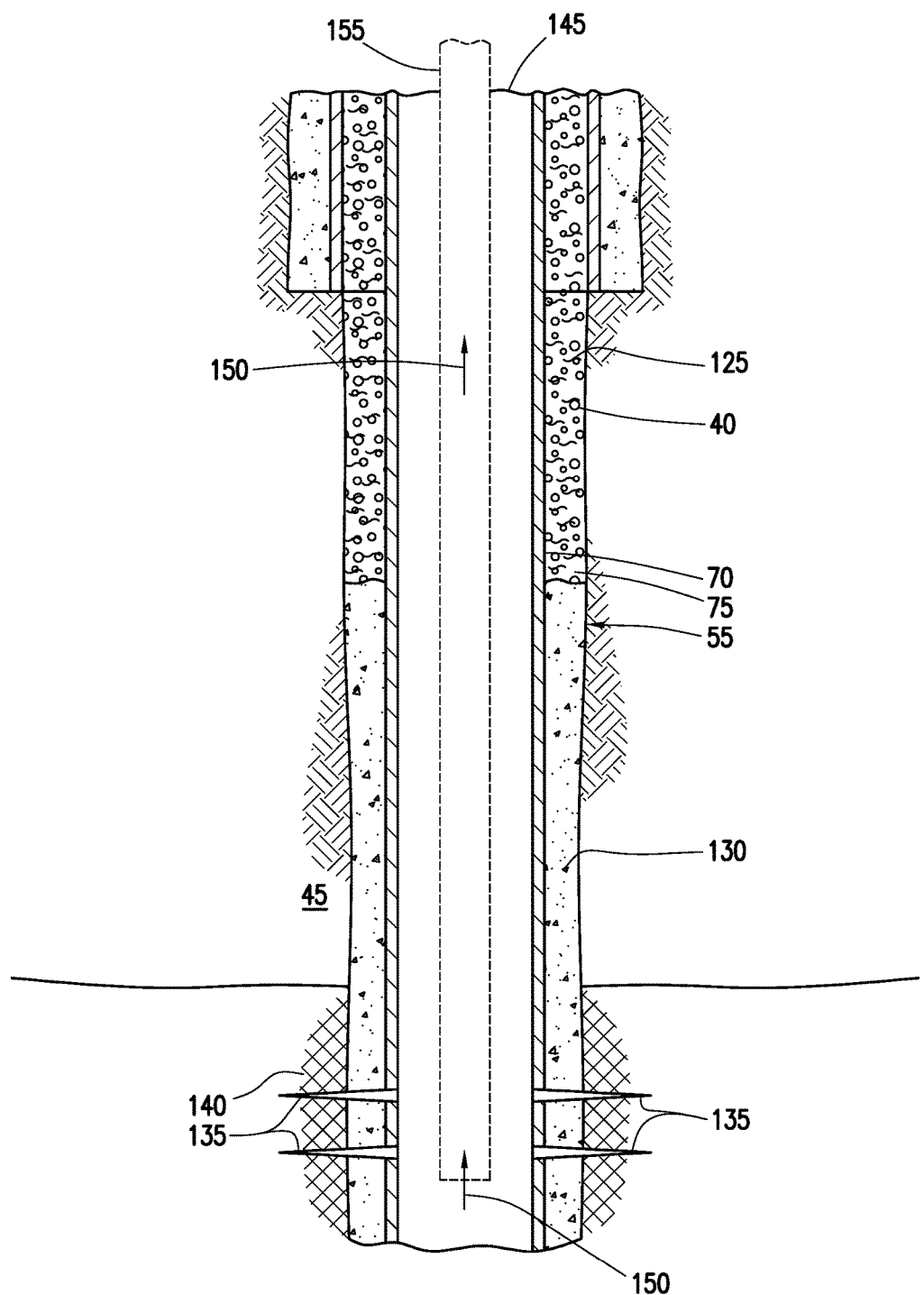
FIG. 4 is a schematic illustration of a spacer fluid comprising a traceable polymeric additive concentrated in a wellbore annulus in accordance with certain embodiments.

Referring now to FIG. 4, the traceable polymeric additive 40 is shown disposed in a spacer fluid 125 in wellbore annulus 75 in accordance with certain embodiments. As previously described, the traceable polymeric additive 40 may be placed in a spacer fluid 125, for example, to alleviate potential problems with annular pressure buildup. As illustrated, the spacer fluid 125 is shown disposed in the wellbore annulus 75 above a cement sheath 130. The wellbore annulus 75 is shown between the wellbore 50 and the casing 70. As previously described, the wellbore annulus 75 may be closed such that the spacer fluid 125 and the cement sheath 130 may be trapped therein, the wellbore annulus 75 having a fixed volume. Hydrocarbon production may be initiated from the wellbore 55 at some point in time after the cementing operation is complete. As illustrated, apertures 135 in the cement sheath 130 may allow hydrocarbons to flow from a producing zone 140 of the one or more subterranean formations 45 up through the casing 70 and to a surface 145, as illustrated by arrows 150. Production tubing 155 may be disposed in the casing 70 to produce a conduit for passage of the hydrocarbons. As previously mentioned, the hydrocarbons may be at elevated temperatures as they flow up through the casing 70 causing fluids, such as the spacer fluid 125, to heat and expand. Such an expansion may cause an undesirable increase in pressure within the wellbore annulus 75 when the volume is fixed, for example. At least a portion of the traceable polymeric additive 40 in the spacer fluid 125 may collapse or reduce in volume so as to desirably mitigate, or prevent, the pressure buildup.

The exemplary traceable polymeric additive 40 disclosed herein may directly or indirectly affect one or more components or pieces of equipment associated with the preparation, delivery, recapture, recycling, reuse, and/or disposal of the disclosed traceable polymeric additive 40. For example, the traceable polymeric additive 40 may directly or indirectly affect one or more mixers, related mixing equipment 15, mud pits, storage facilities or units, composition separators, heat exchangers, sensors, gauges, pumps, compressors, and the like used generate, store, monitor, regulate, and/or recondition the exemplary traceable polymeric additive 40 and fluids containing the same. The disclosed traceable polymeric additive 40 may also directly or indirectly affect any transport or delivery equipment used to convey the traceable polymeric additive 40 to a well site or downhole such as, for example, any transport vessels, conduits, pipelines, trucks, tubulars, and/or pipes used to compositionally move the traceable polymeric additive 40 from one location to another, any pumps, compressors, or motors (e.g., topside or downhole) used to drive the traceable polymeric additive 40, or fluids containing the same, into motion, any valves or related joints used to regulate the pressure or flow rate of the traceable polymeric additive 40 (or fluids containing the same), and any sensors (i.e., pressure and temperature), gauges, and/or combinations thereof, and the like. The disclosed traceable polymeric additive 40 may also directly or indirectly affect the various downhole equipment and tools that may come into contact with the traceable polymeric additive 40 such as, but not limited to, wellbore casing 70, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A well treatment system comprising:
   a treatment fluid for introduction into a wellbore, wherein the treatment fluid comprises a base fluid, a hydraulic cement, and a traceable polymeric additive comprising a swellable polymer and a tagging material; wherein the traceable polymeric additive is particulate in form; wherein the base fluid comprises water; wherein the traceable polymeric additive is present in the base fluid in an amount of about 1% to about 30% by weight of the hydraulic cement; wherein the traceable polymeric additive has a particle size in a range of from about 300 microns to about 1500 microns; wherein the tagging material comprises a thermal neutron absorbing material; wherein a weight ratio of the swellable polymer to the tagging material is about 3:1 to about 1:1; and
   a logging tool for running a neutron log in the wellbore to detect the traceable polymeric additive in the wellbore, wherein the logging tool further comprises a thermal neutron detector, wherein the thermal neutron detector detects thermal neutrons produced and backscattered in the wellbore.

2. The well treatment system of claim 1 wherein the thermal neutron absorbing material is selected from the group consisting of cadmium, boron, gadolinium, iridium, boron carbide, boron nitride, boric acid, boron concentrated glass, zinc borate, borax, gadolinium oxide, gadolinium acetate, gadolinium concentrated glass, and any combination thereof.

3. The well treatment system of claim 1 wherein at least a portion of the tagging material is dispersed in the swellable polymer or present in a coating on the swellable polymer.

4. The well treatment system of claim 1 wherein the swellable polymer comprises at least one elastomer selected from the group consisting of natural rubber, acrylate butadiene rubber, polyacrylate rubber, isoprene rubber, choloroprene rubber, butyl rubber, brominated butyl rubber, chlorinated butyl rubber, chlorinated polyethylene rubber, neoprene rubber, styrene butadiene copolymer rubber, sulphonated polyethylene, ethylene acrylate rubber, epichlorohydrin ethylene oxide copolymer rubber, ethylene-propylene rubber, ethylene-propylene-diene terpolymer rubber, ethylene vinyl acetate copolymer, a fluorosilicone rubber, a silicone rubber, poly 2,2,1-bicyclo heptene, alkylstyrene, a block copolymer of styrene-butadiene rubber, nitrile rubber, hydrogenated nitrile rubber, a fluoro rubber, a perfluoro rubber, a tetrafluorethylene/propylene, an isobutylene maleic anhydride, and any combination thereof.

5. The well treatment system of claim 1 wherein the swellable polymer comprises at least one swellable polymer selected from the group consisting of polymethacrylate, polyacrylamide, a non-soluble acrylic polymer, a starch-polyacrylate acid graft copolymer, polyethylene oxide polymer, a carboxymethyl cellulose polymer, poly(acrylic acid), poly(acrylic-co-acrylamide), graft-poly(ethylene oxide) of poly(acrylic acid), poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, a starch-polyacrylonitrile graft copolymer, and any combination thereof.

6. A well treatment system comprising:
   a base fluid;
   a hydraulic cement;
   a traceable polymeric additive wherein the traceable polymeric additive is particulate in form and comprises a swellable polymer and a tagging material; wherein at least a portion of the tagging material is present in a coating on the polymer, wherein the traceable polymeric additive is positioned in a wellbore;
   wherein the tagging material comprises a thermal neutron absorbing material;
   wherein a weight ratio of the swellable polymer to the tagging material is about 99:1 to about 0.1:1; and
   wherein the swellable polymer comprises at least one polymer selected from the group consisting of a water swellable polymer, oil swellable polymer, dual oil and water swellable polymer, and combinations thereof; and
   a logging tool for running a neutron log in a wellbore to detect the traceable polymeric additive in the wellbore, wherein the logging tool further comprises a thermal neutron detector, wherein the thermal neutron detector detects thermal neutrons produced and backscattered in the wellbore.

7. The well treatment system of claim 6 wherein at least a portion of the tagging material is dispersed in the swellable polymer.

8. The well treatment system of claim 6 wherein the thermal neutron absorbing material comprises at least one material selected from the group consisting of cadmium, boron, gadolinium, iridium, boron carbide, boron nitride, boric acid, boron concentrated glass, zinc borate, borax, gadolinium oxide, gadolinium acetate, gadolinium concentrated glass, and any combination thereof.

9. The well treatment system of claim 6 wherein the swellable polymer comprises at least one elastomer selected from the group consisting of natural rubber, acrylate butadiene rubber, polyacrylate rubber, isoprene rubber, choloroprene rubber, butyl rubber, brominated butyl rubber, chlorinated butyl rubber, chlorinated polyethylene rubber, neoprene rubber, styrene butadiene copolymer rubber, sulphonated polyethylene, ethylene acrylate rubber, epichlorohydrin ethylene oxide copolymer rubber, ethylene-propylene rubber, ethylene-propylene-diene terpolymer rubber, ethylene vinyl acetate copolymer, a fluorosilicone rubber, a silicone rubber, poly 2,2,1-bicyclo heptene, alkylstyrene, a block copolymer of styrene-butadiene rubber, nitrile rubber, hydrogenated nitrile rubber, a fluoro rubber, a perfluoro rubber, a tetrafluorethylene/propylene, an isobutylene maleic anhydride, and any combination thereof.

10. The well treatment system of claim 6, wherein the swellable polymer comprises at least one swellable polymer selected from the group consisting of polymethacrylate, polyacrylamide, a non-soluble acrylic polymer, a starch-polyacrylate acid graft copolymer, polyethylene oxide polymer, a carboxymethyl cellulose polymer, poly(acrylic acid), poly(acrylic-co-acrylamide), graft-poly(ethylene oxide) of poly(acrylic acid), poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, a starch-polyacrylonitrile graft copolymer, and any combination thereof.

11. The well treatment system of claim 6, wherein the base fluid comprises water.

12. The well treatment system of claim 11 wherein a treatment fluid has a density of about 4 lb/gal to about 20 lb/gal, the treatment fluid comprising the base fluid, the traceable polymeric additive, and the hydraulic cement.

13. The well treatment system of claim 11 further comprising a dispersant.

* * * * *